Aug. 7, 1962     H. F. SMITH     3,048,187
VALVE WITH TUBULAR RESILIENT SEAL

Filed Dec. 4, 1959

INVENTOR.
HARRY F. SMITH
BY
WATTS & EDGERTON
ATTORNEYS ved with a longitudinal slot 11 above the open end of

United States Patent Office 3,048,187
Patented Aug. 7, 1962

3,048,187
VALVE WITH TUBULAR RESILIENT SEAL
Harry F. Smith, Lexington, Ohio, assignor to Mansfield Sanitary Inc., Perrysville, Ohio, a corporation of Ohio
Filed Dec. 4, 1959, Ser. No. 857,406
9 Claims. (Cl. 137—437)

This invention relates generally to valves for fluid carrying tubes and particularly to water line valves including bib and ball cock valves.

It has long been customary to employ gaskets or similar packing in valves to prevent the escape of fluid between two cooperating relatively movable members composed of metal or other materials quite resistant to deformation. Such gaskets or packing soon become deformed, as by one metal surface being forced thereinto with resultant decrease in the effectiveness of the sealing action. A familiar example is the common household water valve in which a soft washer is pressed between two metal surfaces, one of which has an annular projecting ridge. The ridge in being repeatedly pressed against the washer soon makes a groove in it through which water may leak. When that condition exists the washer must be replaced.

The present invention aims to provide valves for controlling fluids, particularly liquids, which embody a novel arrangement of parts and a new mode of operation and gives new results. That aim is accomplished by means of the new principle of utilizing fluid pressure in the valve to deform packing means into sealing contact with a relatively nondeformable surface.

The invention will be better understood by those skilled in the art from the following specification read in connection with the accompanying drawings in which.

Figure 1:
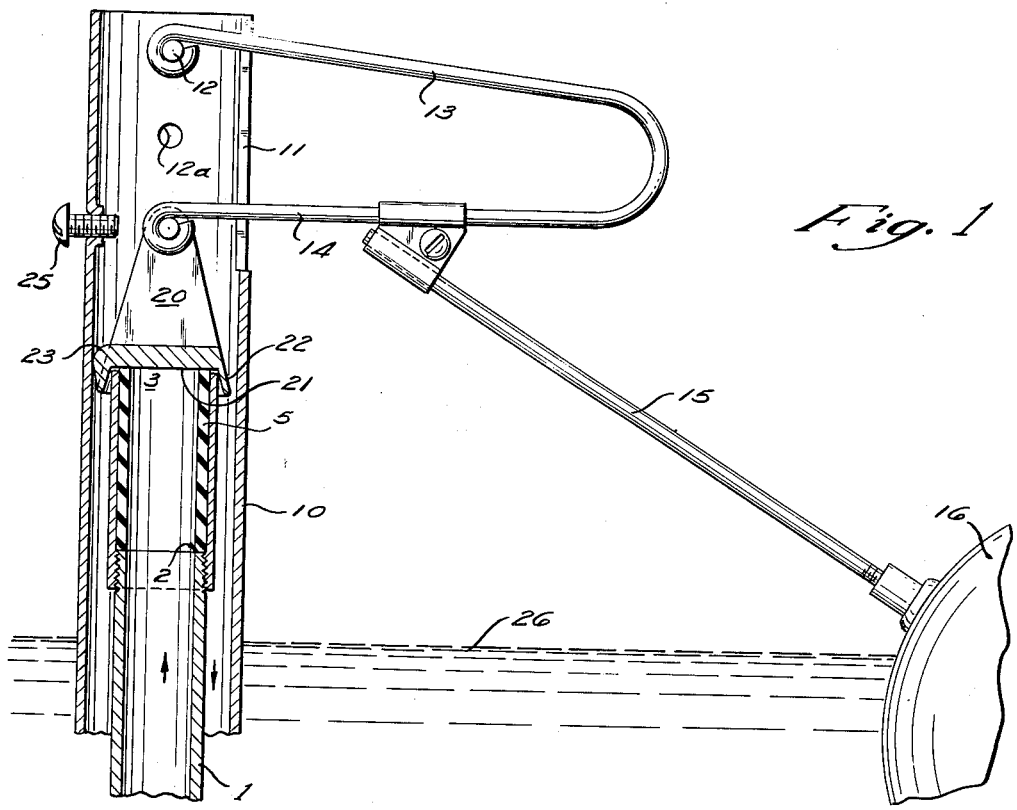
FIGURE 1 is a vertical central sectional view of a ball cock valve embodying the present invention.
Figures 3, 4:
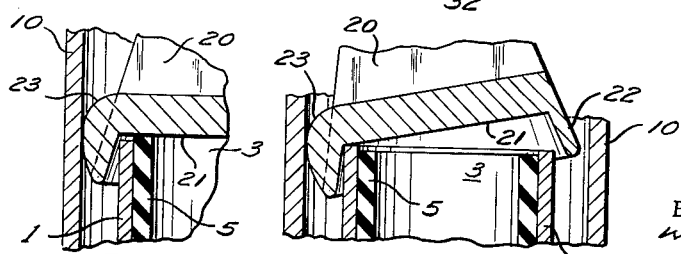
FIGURES 3 and 4 are fragmentary sectional views of parts of FIGURE 1 showing the valve parts in their different positions when the valve is closed and when it is open, respectively.

FIGURES 1, 3 and 4 show a ball cock valve embodying the present invention. That valve is shown as comprising a rigid inlet pipe 1 having an abutment 2 near its open end 3. A resilient, pressure distortable tube 5 is disposed within pipe 1 with one end engaging the abutment 2 and the other end normally lying within the pipe and closely adjacent to the open end of pipe 1. This tube may consist of any material which is deformable but not compressible. Suitable materials include natural rubber and synthetic rubbers and resins which have those properties. The outer surface of tube 5 lies close to and preferably is in contact with the inner surface of pipe 1. A hush pipe 10 extends around inlet pipe 1 and projects above the open end of the latter. This hush pipe is proinlet pipe 1 and with a pin 12 on which is pivotally mounted one end of a U-shaped spring 13 which extends through slot 11. To the lower branch 14 of spring 13 is connected a rod 15 which carries at its lower end a float ball 16. On the end of portion 14 of spring 13 within pipe 10 is pivotally mounted a movable valve or closure 20 which has a sealing surface 21 which is engageable with the open end of inlet pipe 1 and with the adjacent end of tube 5. This closure has a flange 22 surrounding sealing surface 21 and positioned to extend around the open end of pipe 1. Part of flange 21 is provided with an outwardly projecting rounded lug-like part 23 to serve a purpose presently to appear. An adjusting screw 25 has screw threaded engagement with hush pipe 10 and projects into the interior thereof adjacent to the pivoted end of closure 20.

The pipe 10 is provided with two or more holes 12a in which pin 12 may be positioned to adjust the force which may be applied by spring 13 to closure 20.

The operation of the apparatus shown in FIGURES 1, 3 and 4 is substantially as follows:

When the flush valve of a toilet tank is opened and the level of the water 26 therein falls, the float ball 16 falls with it and spring 13 is pivoted about pin 12 with resultant movement of the arm 14 of the spring transversely of hush pipe 10 until such movement is halted by engagement of the closure 20 with the inner end of screw 25. During such transverse movement of arm 14 and closure 20 lug 23 engages the inner wall of pipe 10, acts as a stop to further transverse movement of the closure. Further transverse movement of arm 14 moves the upper end of closure 20 transversely with coincident pivoting of the closure on the open end 3 of pipe 1. As the closure so pivots, surface 21 is tipped up and water is permitted to flow out of pipe 1 and into pipe 10.

Water flowing out of pipe 1 will be deflected downwardly by flange 22 and will draw air into pipe 10 with the result that the water will be aerated and divided to some extent with decreased tendency to splash or cause objectionable noise.

When the flush valve is closed and the surface of the water in the tank rises, it raises the float ball 16. As the ball rises the spring 13 will be pivoted in the opposite direction around pin 12, the closure 20 will roll on pipe 1 and the sealing surface 21 of the closure 20 will be brought into contact with the entire surface of pipe 1. The resulting contact of pipe 1 and surface 21 is sufficiently close substantially to prevent the flow of water out of the inlet pipe, but it is not close enough to form a complete seal. As the rate of flow of the water out of pipe 1 decreases, the water pressure in tube 5 increases and since this tube is composed of resilient pressure-distortable material the tube is subjected to radial pressure and is thereby deformed and lengthened axially with the result that the open end of tube 5 will be brought into good fluid sealing engagement with surface 21 of closure 20. This condition will continue to exist until the flush valve is again actuated whereupon the above described operation will be repeated.

It will be noted that since the smooth open end of tube 5 is engaged with the smooth sealing surface 21 of the closure 20, the tube is in no way damaged when it serves as a seal and hence it may be used with complete satisfaction for periods of time much greater than the length of time an ordinary gasket may be used satisfactorily.

Figure 2:
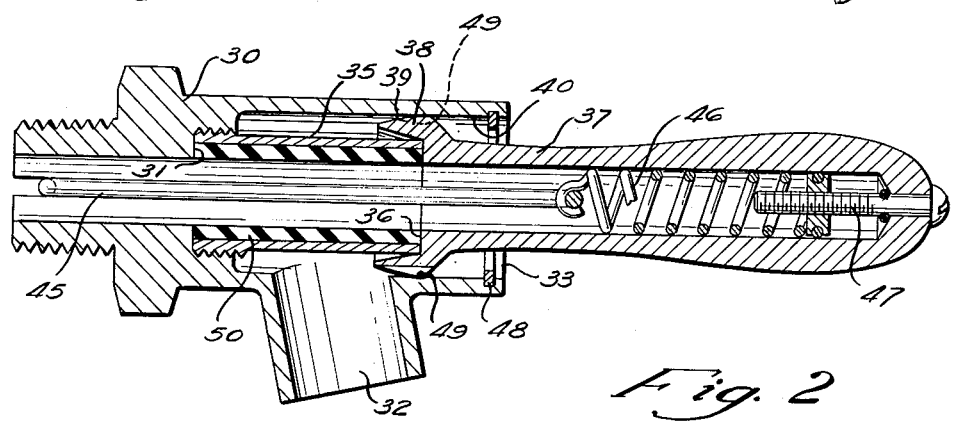
FIGURE 2 is a longitudinal central sectional view of a bib cock embodying the present invention.

FIGURE 2 shows a bib cock valve embodying the present invention. This valve comprises a valve body 30 having an abutment 31 therein, a fluid discharge side opening 32 and an open end 33. A rigid pipe 35 is secured within the body 30 with one end bearing against the abutment 31 and the other end being engageable with a sealing surface 36 on a valve 37 which, as shown, is in the form of a handle. This handle has a flange 38 which surrounds the sealing surface 36 and which has an outer rounded surface which corresponds with a segment of a spherical surface. The surface 39 is movable on the inner surface 40 of body 30 much like that described in connection with lug 23 of FIGURE 1. The handle 37 is connected to the valve body 30 by means of a rod 45 which has a hook-like engagement with the valve body at one end and at the other end is attached to a spring 46 which is within the handle and the tension of which may be adjusted by screw 47 projecting out of andle 37. A retaining ring 48 seated in a groove in the open end of valve body 30 and surrounding handle 37 serves as a means of preventing accidental disassembly of the handle 37 from the body 30 in event of breakage or disconnection of the securing means 45, 46 or 47.

The outer surface 39 of handle 37 is preferably provided with small grooves, indicated at 49 to permit air to be drawn in past the handle when water is flowing out of pipe 50.

A resilient, pressure deformable tube 50, which is quite like tube 5 of FIGURE 1, is disposed within pipe 35 with one end engaging abutment 31, with the outer surface preferably engaging with the inner surface of pipe 35 and with the other end normally lying closely adjacent to the open end of pipe 35 and engageable, when the tube is subjected to interior pressure, with the sealing surface 36 with fluid sealing contact.

The operation of the valve of FIGURE 2 is substantially like that described above in connection with the apparatus of FIGURE 1. However, where the movement of closure 20 of FIGURE 1 is, generally speaking, along the diameter of hush pipe 10, the movement of handle 37 is not so restricted. It may be moved along any diameter of body 30 with resultant opening and closing of the valve.

Air drawn through groove 49 will be entrained in the water flowing into outlet 32 and will subdivide and aerate the water as described above.

It will be noted that surface 23 of FIGURES 1, 3 and 4 is an arc of a circle, the center of which is at the intersection of sealing surface 21 and the adjacent flange 22 of the closure. Similarly, the surface 39 of FIGURE 3 is the arc of a circle having a center at the intersection of sealing surface 36 and flange 38.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A valve for controlling fluids comprising a rigid pipe having an abutment therein and an open discharge end, a movable closure engageable with the said open end, and a resilient, pressure-deformable, non-compressible tube in said pipe, engaging said abutment in the pipe and having a discharge end in the pipe closely adjacent to the open end of the pipe, said tube being deformable lengthwise into sealing engagement with said closure when subjected to the pressure of fluid therewithin.

2. A valve for controlling fluids comprising a rigid pipe having an abutment therein and an open discharge end, a movable closure engageable with the said open end, and a resilient, pressure-deformable, non-compressible tube having one end in engagement with said abutment, having an outer side surface substantially in engagement with the inner surface of the pipe and having a discharge end lying normally within the pipe and closely adjacent to the open end of the latter, the tube being deformable lengthwise into sealing engagement with said closure when subjected to the pressure of fluid therewithin.

3. A valve for controlling fluids comprising a rigid pipe having an abutment therein and an open discharge end, a movable closure engageable with the said open end and having a liquid-deflecting flange to surround said open end of the pipe, a resilient, pressure-deformable, non-compressible tube in said pipe bearing against the pipe, engaging said abutment and having a dischrage end closely adjacent to the open end of the pipe, the tube being deformable lengthwise into sealing engagement with said closure when subjected to the pressure of fluid therewithin.

4. A ball cock valve for controlling fluids comprising an inlet pipe having an abutment therein and an open discharge end, a movable closure engageable with the said open end, and having a sealing surface and a flange projecting therefrom to extend around said open end, a resilient, pressure-deformable, non-compressible tube in said pipe, engaging said abutment in the pipe and engageable with the inner surface of said pipe and with said sealing surface, said tube being deformable lengthwise into sealing engagement with said sealing surface when subjected to the pressure of fluid therewithin, a hush pipe around the inlet pipe, spring means pivotally carried by the hush pipe for movement transversely thereof and pivotally carrying said closure, and a float ball attached to said spring means, downward movement of said ball serving to swing the spring means about its pivot and to actuate said closure into and out of pipe closing position.

5. A bib cock valve comprising a valve body having an abutment therein, a fluid discharge side opening and an open end, a valve swingably mounted in said open end and having a sealing surface and a liquid-deflecting flange projecting therebeyond, an open ended, rigid pipe in the body with one end engaging the abutment and the other end engageable with the sealing surface of the valve, and a resilient, pressure-deformable, non-compressible tube in said pipe engaging said abutment at one end, bearing against the inner surface of the discharge end of said pipe and the other end being engageable with said sealing surface of the valve, the tube being deformable lengthwise into sealing engagement with said sealing surface when subjected to the pressure of fluid therewithin, and spring means connecting said valve to said valve body.

6. A valve for controlling fluids comprising a rigid pipe having an abutment therein and an open discharge end, a movable closure engageable with the said open end, a resilient, pressure-deformable, non-compressible tube in said pipe, engaging said abutment in the pipe and having a discharge end in the pipe closely adjacent to the open end of the pipe, said tube being deformable lengthwise into sealing engagement with said closure when subjected to the pressure of fluid therewithin, and resilient means connected to said pipe and closure for urging it against said pipe.

7. A valve for controlling fluids comprising a rigid pipe having an abutment therein and an open discharge end, a movable closure engageable with the said open end, a resilient, pressure-deformable, non-compressible tube having one end in engagement with said abutment, having an outer side surface substantially in engagement with the inner surface of the pipe and having a discharge end lying normally within the pipe and closely adjacent to the open end of the latter, the tube being deformable lengthwise into sealing engagement with said closure when subjected to the pressure of fluid therewithin, and means for urging said closure against the open end of said pipe, said means including a spring connected to said pipe and to said closure.

8. A valve for controlling fluids comprising a rigid pipe having an abutment therein and an open discharge end, a movable closure engageable with the said open end, a resilient, pressure-deformable, non-compressible tube having one end in engagement with said abutment, having an outer side surface substantially in engagement with the inner surface of the pipe and having a discharge end lying normally within the pipe and closely adjacent to the open end of the latter, the tube being deformable lengthwise into sealing engagement with said closure when subjected to the pressure of fluid therewithin, and means for urging said closure against the open end of said pipe, said means including a spring pivotally connected to the closure and to the pipe for movement of both transversely of said pipe and a float ball attached to the spring for moving it about its pivots.

9. A valve for controlling fluids comprising a rigid pipe having an abutment therein and an open discharge end, a movable closure tiltably engageable with the said open end to open and close said end, a resilient, pressure-deformable, non-compressible tube having one end in engagement with said abutment, having an outer side surface substantially in engagement with the inner surface of the pipe and having a discharge end lying normally within the pipe and closely adjacent to the open end of the latter, the tube being deformable lengthwise into sealing engagement with said closure when subjected to the pressure of fluid therewithin, and means for urging said closure against the open end of said pipe, said means including a spring connected to said pipe and closure and means for varying the force of the spring applied to the closure.

References Cited in the file of this patent

UNITED STATES PATENTS

| | | |
|---|---|---|
| 448,262 | Runnels | Mar. 17, 1891 |
| 943,755 | Morrison | Dec. 21, 1909 |
| 945,083 | Dane | Jan. 4, 1910 |
| 1,025,827 | Parkinson | May 7, 1912 |
| 2,784,735 | Barr et al. | Mar. 12, 1957 |